United States Patent [19]

Chung

[11] Patent Number: 5,724,275

[45] Date of Patent: Mar. 3, 1998

[54] FAST MULTI-OPERAND BIT PATTERN DETECTION METHOD AND CIRCUIT

[75] Inventor: Shine Chien Chung, San Jose, Calif.

[73] Assignee: Hitachi Microsystems, Inc., San Jose, Calif.

[21] Appl. No.: 620,370

[22] Filed: Mar. 22, 1996

[51] Int. Cl.[6] ...................................................... G06F 7/00
[52] U.S. Cl. ................................. 364/715.1; 364/715.11
[58] Field of Search ........................... 364/715.1, 715.09, 364/715.11, 715.04

[56] References Cited

U.S. PATENT DOCUMENTS 4,926,369  5/1990  Hokenek et al. ...................... 364/748
5,317,527  5/1994  Britton et al. ...................... 364/715.04
5,383,142  1/1995  Chung ................................. 364/715.11

*Primary Examiner*—Reba I. Elmore
*Assistant Examiner*—Robert J. Dolan
*Attorney, Agent, or Firm*—Graham & James LLP

[57] ABSTRACT

A process and associated apparatus for performing bit pattern detection, such as leading one detection and leading transition detection for early normalization of the result of an operation on floating point numbers. Such an operation can be an addition or a subtraction of floating point numbers. In parallel with this operation, this process and associated apparatus divide the operands into bit groups. These bit groups are operated on and represented by states and addresses, which are propagated through several levels to detect the bit pattern.

20 Claims, 12 Drawing Sheets

LEADING ONE DETECTION

TWO OPERAND L1D

LEADING TRANSITION DETECTION
BLK 2

PARTIAL STATE               Figure 11

FAST MULTI-OPERAND BIT PATTERN DETECTION METHOD AND CIRCUIT

BACKGROUND OF THE INVENTION

1. Field of the Invention

The present invention relates to processes of and systems for detecting bit patterns. More particularly, but without limitation, the present invention relates to processes and systems for detecting a bit pattern in the result of an operation on operands, while the operation is occurring.

2. Description of Related Art

The problem of detecting bit patterns in binary numbers arises in such applications as computer arithmetic hardware design. Processes and circuits for detecting bit patterns in bit strings have been developed in the past. See for example U.S. Pat. No. 5,383,142, which is hereby incorporated by reference. Such processes are for operating on a bit string to find a bit pattern within the bit string. An example of a bit pattern detection is a leading one detection. The problem of a leading one detection is to find the position of the first "1" bit from left to right in a bit string. For example, a bit string "00001101" of length eight has the first "1" in bit position four, i.e. A4. The bit position numbering starts from bit position zero, A0, which is the first position counting from the left, and continues up to bit position seven, which is occupied by the eighth bit. In past approaches to detecting the leading one bit, the first step is to divide the bit string into bit groups and to generate a state assignment table, as shown in Table I.

TABLE I

| Bit Group | State | Partial Address |
|---|---|---|
| 00 | S | 0 |
| 01 | F | 1 |
| 10 | F | 0 |
| 11 | F | 0 |

In Table I, the bit group column lists all the combinations of pairs of bits (a pair being the size of the selected bit groups). Further in Table I, the state column contains states that represent the bit groups. A state is a collection of bit groups that have common properties. "S" and "F" stand for search and found states, respectively. The search state stands for a state in which a "1" bit has not been found in a given bit group, whereas the found state represents the fact that a "1" bit has been found in a bit group. Further in Table I, a partial address column lists the partial addresses of the location of a "1" in a given bit group. A partial address of zero indicates that the first "1" bit was found in bit position zero of the bit group, i.e. the left bit is a "1." A partial address of one indicates that the first "1" bit was found in bit position one A1, i.e. the right bit position in a bit pair. So, for example, in row three of Table I, the partial address of bit group "10" is zero, since the first "1" is in bit position A0 within the bit group. In the second row of Table I, the partial address of "1" indicates that the first "1" bit is in the first bit position of the bit group. In the first row the partial address of "0" is simply an arbitrary choice. The choice is arbitrary because there is no "1" bit within the bit group "00."

Conventionally, a bit string is divided into bit groups, i.e. bit pairs, starting at the left of, for example, an eight bit string. Next the states are propagated and partial addresses are assigned, as illustrated with respect to bit string "00001101," shown in the example immediately below.

| | Example | | | | | | | |
|---|---|---|---|---|---|---|---|---|
| bit position | A0 | A1 | A2 | A3 | A4 | A5 | A6 | A7 |
| | 0 | 0 | 0 | 0 | 1 | 1 | 0 | 1 |
| Level 1 | S(0) | | S(0) | | F(0) | | F(1) | |
| Level 2 | S(00) | | | | S(10) | | F(00) | |
| Level 3 | F(100) | | | | | | | |

This example proceeds through three levels to arrive at the final state and the address of the leading one bit. In the first level, the bit groups are processed per Table I. The left most bit group "00" (bit positions A0 and A1) of bit string "00001101" is represented by a search state, which means that a "1" bit has not been found in this bit group. Similarly, using Table I, the second bit group from the left (bit positions A2 and A3) are represented by a search state. However, the bit groups encompassing bit positions A4, A5 and A6, A7 are represented by find states, because they each contain a "1" bit.

In parentheses behind the state designation for each bit group is the partial address of the "1" bit in that bit group. The partial address is determined in accordance with the partial address column of Table I. Since the left most bit group (A0, A1) does not contain a "1" bit, per Table I, the partial address arbitrarily will be zero. But, for the right most bit group "01" (A6, A7), there is a "1" bit in that group. According to Table I, such a bit group has a partial address of one, because the "1" bit is in the first bit position A1 within that bit group. Similarly, the addresses for the remaining bit groups are derived from Table I.

Next, the states of the first level propagate down to the second level. This propagation occurs similarly to how the bit groups are propagated to the first level. Accordingly, the two adjacent left most search states combine into another search state, because both states represent that a "1" bit has not been found. Similarly, the right most adjacent states of the first level are propagated by combining them into a find state. They result in a find state, because at least one of the states is already a find state. Also in the second level, the search state has a partial address of "10," which is arbitrary, since a "1" bit has not been found. The find state in the second level has a partial address of "00." This address is "00" because a "0" was added to the left of the partial address of the first find state, F(0), in the first level. A "0" was added instead of a "1," because the first state (instead of the second state) in the bit group consisting of F(0), F(1) is an F state. The third level results from the propagation of the S(10) and F(00) states in the second level. Since one of these two states is a found state, the resulting state in the third level is a found state, as well. The partial address of this found state is "100." To arrive at this partial address, the partial address of the first found state in the second level has appended to it a "1" or a "0" depending on whether the found state is the more or less significant state of the two states in the second level. Since the found state is the right half of the second level, the partial address in the third level is generated by appending a "1" to the beginning of the partial address of the found state in the second level. Interpreting the result in the third level, the fact that in the third and final level the state is an F state shows that a leading one bit has been found. The actual address within the original bit string "00001101" is the partial address of the final state in the third level "100," i.e. four in decimal notation. Looking at the original bit string, indeed the first "1" bit is found in the fourth bit position A4.

SUMMARY OF THE INVENTION

This invention provides a process and a system for detecting a data bit pattern in a result of an operation on operands, in parallel with the operation on the operands. An advantage of this invention is that it provides a simple yet fast approach for determining a bit pattern in the result of, for example a subtraction, before the subtraction operation is completed and the result of the subtraction is available. Another advantage of this invention is that it can be applied to general bit pattern detection, of which leading one detection and leading transition detection are examples.

From a process standpoint, a preferred embodiment of the invention comprises the following steps of operating on at least a first operand and a second operand, each operand having a plurality of data bits in bit positions. A plurality of bit groups are received with a circuit from the operands, the bit groups comprising data bits from identical bit positions from each operand. The operation on each bit group is executed with the circuit for generating bit strings, each bit string corresponding to one bit group. An initial state and a corresponding initial partial address is assigned with the circuit for each bit string. The initial states and initial partial addresses are propagated with the circuit for generating a final state and a final address representative of the bit pattern.

From a system standpoint, a preferred embodiment of the invention comprises the following apparatus for detecting a bit pattern in the result of an operation on at least a first operand and a second operand, each operand having a plurality of data bits in bit positions. A circuit configured to receive a plurality of bit groups from the operands, the bit groups comprising data bits from identical bit positions from each operand. The circuit configured to execute the operation on each bit group and thereby generate bit strings, each bit string corresponding to one bit group. The circuit configured to assign an initial state and a corresponding initial partial address for each bit string. The circuit configured to propagate the initial states and initial partial addresses and thereby generate a final state and a final address representative of the bit pattern.

BRIEF DESCRIPTION OF THE FIGURES

The invention will now be described with reference to the accompanying drawings, wherein.

DETAILED DESCRIPTION OF THE PREFERRED EMBODIMENTS

The following description is of the best presently contemplated modes of carrying out the invention. This description is made for the purpose of illustrating the general principles of the invention and is not to be taken in the limiting sense.

Figure 1:
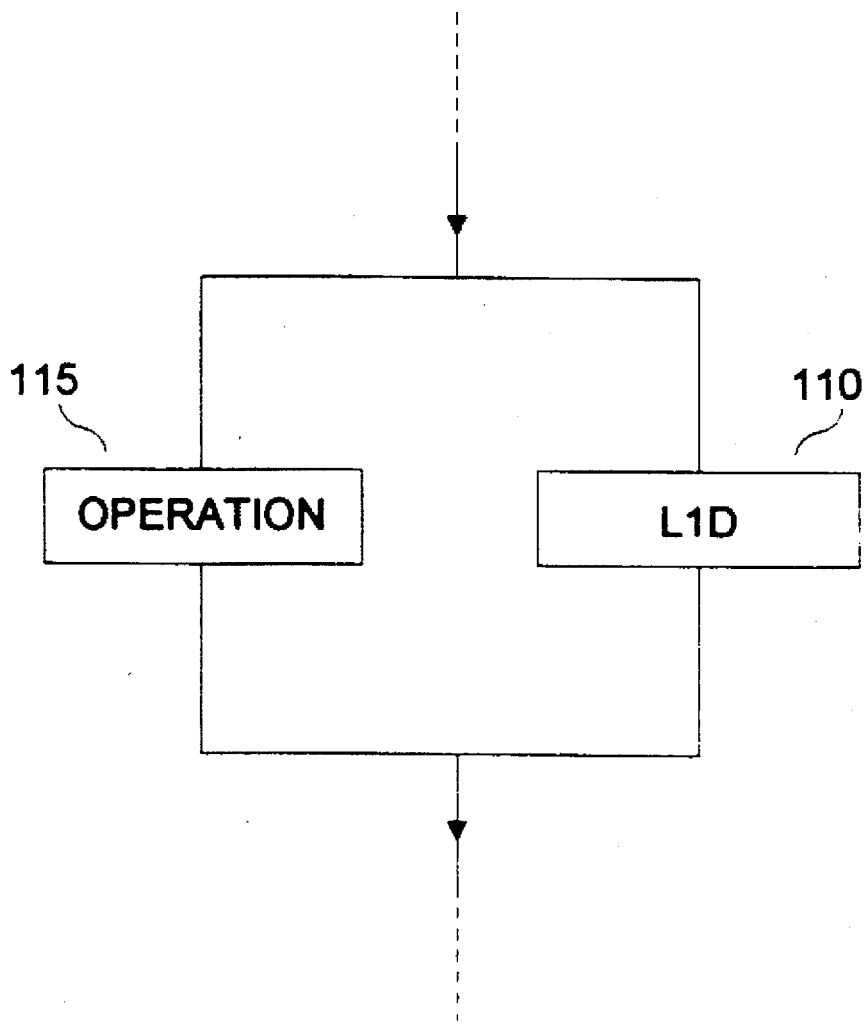
FIG. 1 is a flow chart illustrating a leading one detection executed in parallel with an operation, in accordance with a presently preferred embodiment of the invention.

An application of this presently preferred embodiment is illustrated in FIG. 1. This embodiment can be applied to general bit pattern detection problems, such as in the field of digital signal processing. An example of a bit pattern is the position of a leading (or most significant) "1" bit. FIG. 1 shows that a leading one detection 110 is executed substantially in parallel in time with an operation 115. Examples of such operations are additions and subtractions of operands, such as binary, octal, and hexadecimal numbers. The operation 115 can be executed on any number of operands. This preferred embodiment makes possible the detection of the most significant "1" bit in the result of, for instance, an addition operation 115 of binary numbers, without having to wait for the completion of the addition operation 115. Of course, application of the leading one detection ("L1D" 110) of this embodiment also can occur either before or after the addition 115.

Leading One Detection

Figure 2:
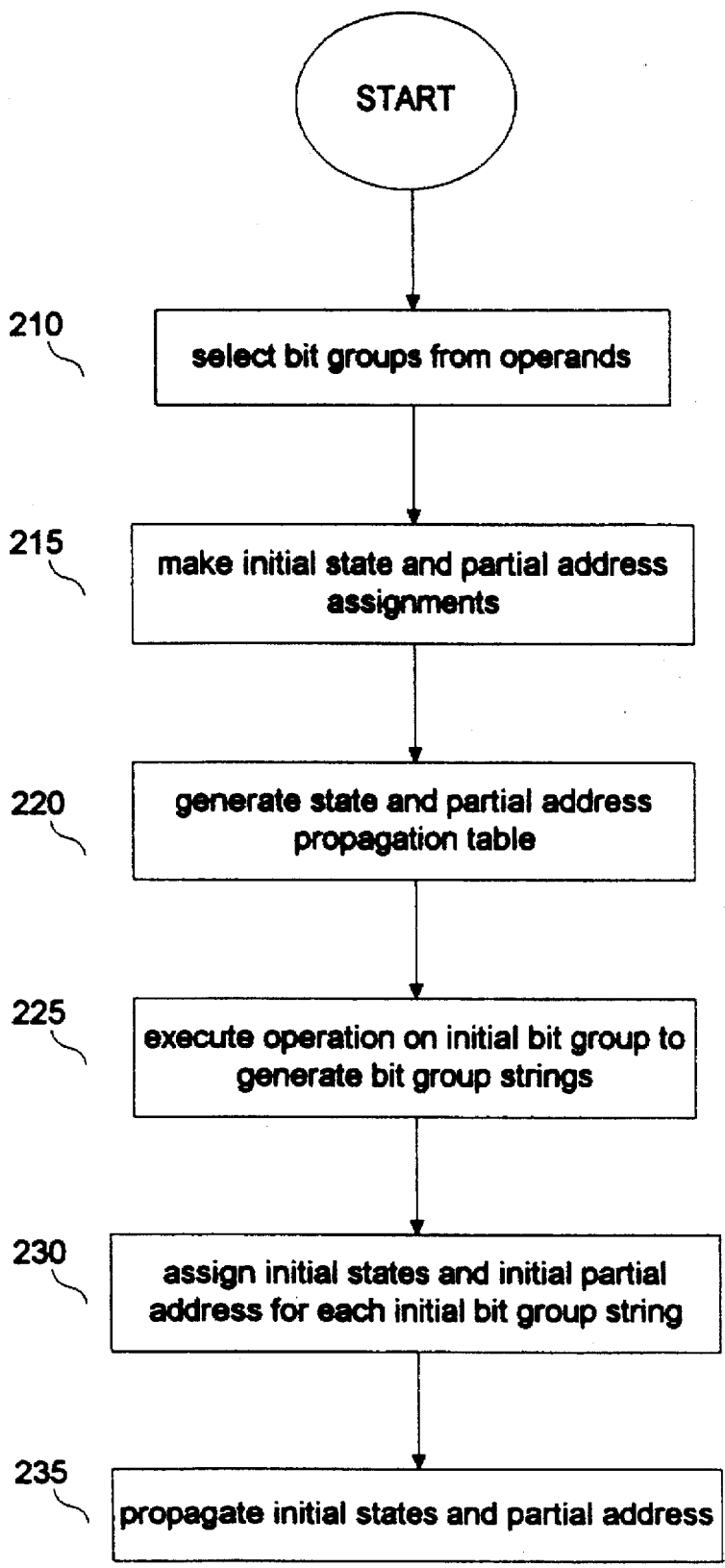
FIG. 2 is a flow chart illustrating leading one detection within the result of an operation on operands, in accordance with a presently preferred embodiment of the invention.

FIG. 2 is a flow chart of a preferred embodiment of a process for detecting a leading one within the result of an operation on operands, such as an addition and/or subtraction. The individual steps of FIG. 2 are discussed in further detail below. For simplicity, this embodiment is discussed in terms of two operands. However this embodiment is easily expandable to any number of operands, as will be clear to one knowledgeable in the art based upon the present description. In this embodiment, initial bit groups are selected 210 from the two operands. In step 215, initial state and partial address assignments are made. In step 220, a state and partial address propagation table is generated. In step 225, an operation is executed on the initial bit groups to generate bit group strings. The operation in step 225 is the same operation that is executed on the two operands, such as an addition or a subtraction.

The discussion below is in terms of subtractions of two positive numbers (operands) from each other. However, that discussion applies equally well to an addition of operands. Indeed, the subtraction can be converted into an addition by use of for example, a two's complement form. Of course, other formats, such as the ones complement, can be used too. When the operands are floating point numbers, this preferred embodiment simply operates on the mantissas of the floating point numbers after properly aligning the binary points of the floating point numbers.

As is well known, a subtraction of two positive operands using the two's complement form is an addition, except that the operands have an additional data bit, a sign bit to the left of bit position A0, which may be a one or a zero. The choice of which operand to represent in the two's complement form depends upon which positive operand is being subtracted from which. The leading one detection of this embodiment detects (in parallel with the generation of the sum by an adder) the most significant "1" bit in the positive sum of two operands, one of which has been transformed into a negative number by taking its two's complement. Initially, in this embodiment, it is unknown which positive operand is larger. So, this embodiment operates in parallel on the subtraction of the larger operand from the smaller one (resulting in a negative sum) and on the subtraction of the smaller operand from the larger one (resulting in a positive sum). However, the leading one detection applied to the subtraction of the larger operand from the smaller one is discarded, because, in the two's complement form, the leading one will be the "1" in the sign bit position. Knowing that a sum is negative is of little value in, for example, the normalization of the sum for floating point purposes. But detecting the most significant "1" bit in the positive sum does permit normalization of the result of this subtraction to bring it into a particular floating point number format.

In step 230, initial states and initial partial addresses are assigned according to a state propagation table for each initial bit group string. In step 235, the initial states and the partial addresses are propagated per the state propagation table to generate a final state and a final address within a plus or minus one accuracy, as further discussed below.

Figure 3:
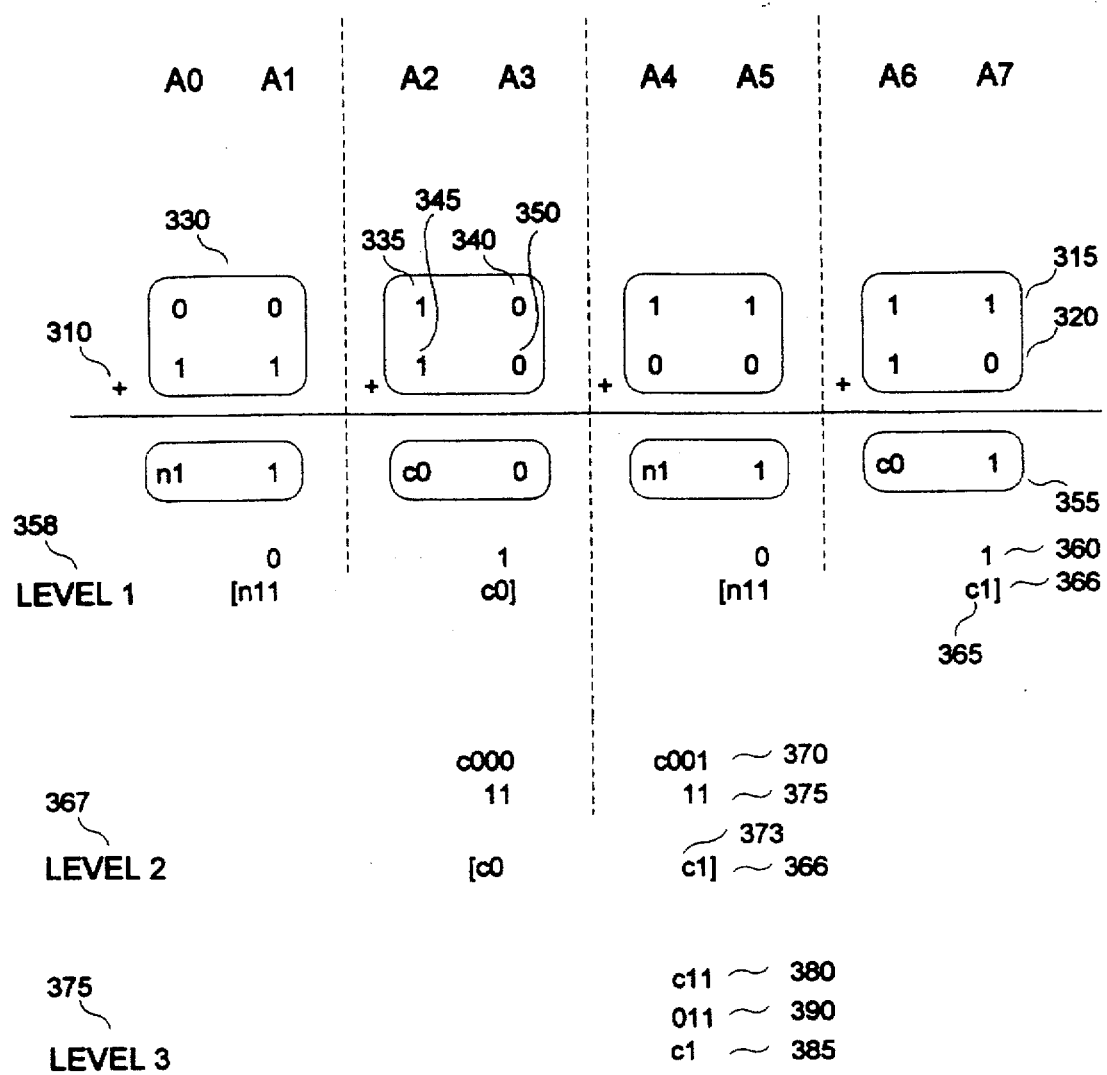
FIG. 3 is a diagram illustrating leading one detection for a subtraction of two numbers, in accordance with a presently preferred embodiment of the invention.

The following discussion of FIG. 3 elaborates on the steps of FIG. 2. FIG. 3 illustrates a preferred embodiment of detecting a leading one in an example of subtracting a data bit string "11110" from a data bit string "101111." FIG. 3 illustrates an operation 310 that is an addition of a first operand 315 and a second operand 320. The first operand 315 is the data bit string "00101111." The second operand 320 is another data bit string "11100010," which is the two's complement of bit string "11110." The first operand 315 and the second operand 320 are divided into bit groups 330, as shown in FIG. 3. The bit groups 330 include pairs of adjacent bits, such as 335 and 340, in the first operand 315 and from adjacent bits, such as 345 and 350, in the second operand 320.

The pairs of bits in the first operand 315 are selected to be aligned in bit position with the pairs selected from the second operand 320 (as further illustrated in FIG. 5 below). For instance, in FIG. 3, the bit pair 335 and 340 of the first operand 315 occupies bit positions A2 and A3. Similarly, the bit pair 345 and 350 in the second operand 320 also occupies bit positions A2 and A3. Of course, bit groups can include more than two bits in each operand 315, 320, but a bit group including a number of bits that is a power of two is preferred.

The result of the operation 310 on the bit groups 330 in FIG. 3 is a series of bit strings 355. Since in the example of FIG. 2, there are four bit groups 330, the operation 310 results in four bit strings 355. Each of the four bit strings 355 is the result of the operation 310 on pairs of bits 335 and 340 in the first operand 315 and the corresponding pairs of bits 345 and 350 in the second operand 320. In the bit strings 355, a "c" stands for carry and an "n" stands for no carry. So, for example, the most significant bit string, "n11," has no carry because the addition 310 of the bit pair "00" to the pair "11" did not produce a carry. However, the addition 310 of the pair "10" to the pair "10" did produce a carry "c" in the second most significant bit string 355.

Figure 4:
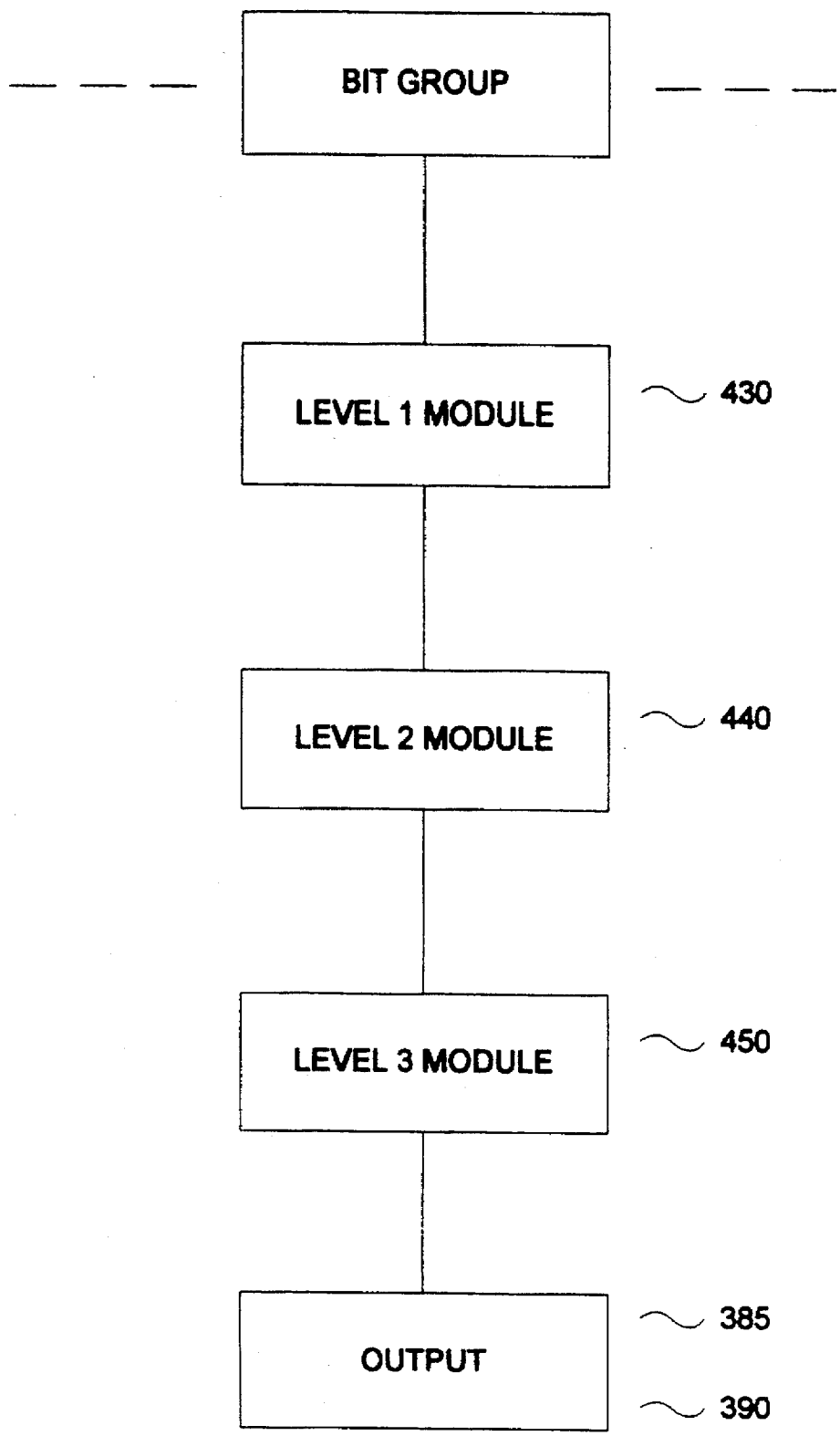
FIG. 4 is a block diagram illustrating a circuit for a leading one detection, in accordance with a presently preferred embodiment of the invention.

The operations 310 on each of the four bit groups 330 can be accomplished using relatively little hardware. For example, a single carry propagation adder can add the pair of bits 335 and 340 of the first operand 315 to the pair of bits 345 and 350 of the second operand 320. FIG. 4, discussed further below, illustrates this approach. In FIG. 4, the bit pairs of a bit group 330 are added by a carry propagation adder (605 see FIG. 6) inside level 1 module 430. For faster execution of the operation 310 on the bit groups 330, in the example of FIG. 3, four parallel carry propagation adders 605 can be used to perform the operation 310 on all four of the bit groups 330 in parallel. Although the operands 315 and 320 in FIG. 3 are only eight bit operands, it will be clear to a person of ordinary skill in the art based upon the present discussion that this presently preferred embodiment can be applied to operands 315 and 320 of any number of bits.

In accordance with step 210 of FIG. 2, having selected the bit groups 330 in FIG. 3, the initial state assignments are made (step 215 in FIG. 2) per Table II. Table II shows all the possible combinations that can result from the addition of two 2-bit strings.

TABLE II

| Possible Sums of Bit Pairs | | |
|---|---|---|
| 00 | 01 | 01 |
| 00 | 00 | 01 |
| — | — | — |
| n00 | n01 | n10 |
| 10 | 11 | 11 |
| 00 | 00 | 01 |
| — | — | — |
| n10 | n11 | c00 |
| 10 | 11 | 11 |
| 10 | 10 | 11 |
| — | — | — |
| c00 | c01 | c10 |

As in FIG. 3, "n" and "c" stand for no-carry and carry, respectively. Table II shows that the addition of two 2-bit strings can result in nine possible sums. The nine possible sums of Table II can be represented by the following five states: n00, n01, n11, c0, and c1. To illustrate the rationale for selecting these five states, the bit strings "n01" and "n10" in Table II are represented by the same state "n01," because state n01 is selected to represent bit strings "n01, n10, n101, n110, etc . . . " Similarly, the bit strings "c10" and "c01" are represented by the same state, because state c1 is selected to represent the following bit strings "c10, c01, c11, c110, etc . . . " Below is a summary of the states with examples of the bit strings that all of the five states can represent, where the states are to the left of the equality sign and the examples of the bit strings are to the right. These states are shown to represent bit strings of length one or greater, aside from a possible carry bit, which is designated "n" for no carry and "c" for carry.

n00={n00, n0, n000, n0000, . . . } n01={n01, n10, n010, n001, . . . } n11={n1, n11, n111, n1111, . . . } c0={c0, c00, c000, c0000, . . . } c1={c01, c1, c10, c11, c110, . . . }

So even though FIG. 3 shows bit strings that are bit pairs, this preferred embodiment applies to bit strings of any length. In other words, the operands 315, 320 can be divided into bit groups 330 comprising bit strings of more than two bits plus a carry bit and still be represented by these five states.

Differences among states are that, for instance, the states n00, n01, and n11 do not have carries, whereas states c0 and c1 do. Additional differences between states can be seen by examining concatenations with states. For purposes of this description, a concatenation of two bit strings is illustrated, as follows. For example, concatenating the bit string "n01" (the most significant bit string) with the bit string "c01" (the least significant bit string) results in the bit string "n1001." The result of this concatenation, [n01, c01], is produced as follows: the bits "01" of the least significant bit string "c01" make up the least significant two bits of the concatenation result. The third significant bit from the right of the concatenation result is produced by adding the carry "c" of the least significant bit string to the least significant bit ("1") of the most significant bit string "n01", resulting in a carry. That carry is added to the most significant bit of the most significant bit string thereby producing the most significant bit ("1") of the concatenation result.

The results of concatenating various states are shown below in Table IV. Table IV is a concatenation table, because it shows the states resulting from all possible concatenation combinations of the five states, discussed above. The most significant states of a concatenation are listed under the column with the heading "1st." The least significant states of a concatenation are listed in the row with the heading "2nd." To illustrate, state "n11" concatenated with state "c0" results in a "c0" state.

Using this type of concatenation, state c0 is different from state c1 because, for example, the concatenation [c1, n0], per Table IV, results in state c1, which is a matched state, i.e. the bit pattern ("1") is contained within the result of the concatenation. Yet, the concatenation [c0, n0] results in state c0, which is not a matched state, since bit strings represented by c0 do not contain the "1" bit. So, c1 and c0 are different states, because not all of their concatenations with other states result in the same states. Similarly, states n11 and n01 also differ, as can be seen from the following. The concatenation [n11, c1] results in a bit string represented by state c1. Whereas the concatenation [n01, c1] results in a bit string represented by state n01. But as mentioned above, states c1 and n01 differ. Therefore, n11 and n01 are different states, as well.

In step 215, initial partial addresses also are selected for each initial state, as shown in Table III, which is implemented by a circuit, as discussed further below (see FIG. 5).

TABLE III

| Sum string | 000 | 001 | 010 | 011 | 100 | 101 | 110 | 111 |
|---|---|---|---|---|---|---|---|---|
| Initial Partial Address | 1 | 1 | 0 | 0 | 1 | 1 | 0 | 0 |
| Initial State | n00 | n01 | n01 | n11 | c0 | c1 | c1 | c1 |

Table III shows all possible sum strings 355 resulting from the addition of two bit pairs. The sum strings of Table III are all the possible sum strings 355 that can be generated by the addition 310 of pairs of bits, such as 335, 340 and 345, 350 in bit groups 330 of FIG. 3. The left most bit position of each sum string is the carry bit position. The second bit position from the left (A0) is the most significant bit position of the sum string. The third bit position from the left (A1) is the least significant bit position of the sum string.

Table III also shows initial states that represent the sum strings. In addition, Table III lists initial partial addresses of the initial states. For example, the initial partial address of the initial state n01 representative of the sum string "001" is "1," because the "1" bit appears in bit position A1 in the bit string "001." Similarly, the initial partial address of state n01 representative of bit string "010" is "0," because the "1" bit appears in the A0 bit position. Therefore, even though the sum bit strings "001" and "010" are represented by the same state n01, their partial addresses differ. The partial address of a bit pair "00" is arbitrarily selected to be "1," regardless of whether or not there is a carry. Therefore the initial partial address of bit strings "000" and "100" is "1." Similarly, the initial partial address of any bit string "01" excluding the carry bit is "1," because the first "1" bit is detected only in the A1 bit position of those bit pairs.

According to step 220 of FIG. 2, a state and partial address propagation table is generated. The state and partial address propagation table, Table IV (implemented by the circuit of FIG. 5), is shown below.

TABLE IV

State and Partial Address Propagation

| 1st/2nd | n00 | n01 | n11 | c0 | c1 |
|---|---|---|---|---|---|
| n00 | n00(2) | n01(2) | n01(1) | n01(1) | n01(1) |
| n01 | n01(1) | n01(1) | n01(1) | n01(1) | n01(1) |
| n11 | n01(1) | n01(1) | n11(1) | c0(2) | c1(2) |
| c0 | c0(2) | c1(2) | c1(2) | c1(1) | c1(1) |
| c1 | c1(1) | c1(1) | c1(1) | c1(1) | c1(1) |

In parentheses behind each concatenation result in Table IV, there are shown numbers that indicate how the partial addresses are selected (i.e., propagated) for the particular concatenation result. Table IV is derived from general rules for propagating the partial addresses. These rules are as follows:

(1) If, in a concatenation result, a bit pattern is detected and the bit pattern that is detected originates from the first (most significant) bit string, the partial address of the first bit string is selected.

(2) If in a concatenation result, a bit pattern is detected and the bit pattern that is detected originates from the second (least significant) bit string, the partial address of the second bit string is selected.

(3) if the bit pattern is detected and it originates from the first and second bit strings, the partial address of the first is selected.

(4) If the bit pattern is not detected, the partial address of the second bit string is selected.

(5) If the partial address is selected from the first bit string, a "0" bit is attached to the left of the most significant bit of that partial address. Otherwise, if the partial address is selected from the second bit string, a "1" is attached to the left of the partial address of the second bit string. In this manner, partial addresses increase by one bit following propagation from one level, as will be further explained below.

For the case of a leading one detection problem, the bit pattern discussed above in the five rules is the leading "1" bit. The third rule is not applied to leading one detection, but it is applied to more general pattern detection. For instance, when looking for a bit pattern "101," the concatenation [10, 10] results in the bit string "1010," which contains the pattern that is being searched for, i.e. "101." Here the bit pattern "101" originates from both, the most and the least significant bit strings.

Table IV points to an additional basis for classifying states. Two states, such as n00 and n11, can differ in how partial addresses are selected for a result of a concatenation of bit strings that these states represent. For instance, the concatenation [n000, c010] results in the bit string "n001010" for which, per Table IV, the partial address of the first (most significant) bit string (n000) is selected. The concatenation [n111, c010] results in the bit string "c000010" for which, per Table IV, the partial address of the second (least significant) bit string (c010) is selected.

The application of Table III and Table IV is illustrated in FIG. 3. In a first level 358 in FIG. 3, for each column as indicated by dashed lines, the initial partial addresses 360 are assigned to the sum bit strings 355 in accordance with Table III. The initial states 365 also are selected per Table III. They represent the partial sum strings 355. Propagation of the partial addresses, as illustrated with examples below, from the first level 358 to the next level proceeds according to Table IV, once the initial states 365 and the initial partial addresses 360 have been assigned.

The brackets 366 in FIG. 3 around pairs of initial states 365 indicate that those initial states 365 are concatenated, as explained above, to produce states for a second level 367. So, the concatenation results 370 of [n11, c0] and of [n11, c1] are the bit strings "c000" and "c001." The partial addresses 375 of these strings are determined according to Table IV. To illustrate, for the concatenation of initial states n11 and c0 in the first level 358, per Table IV, which lists a "(2)" for this concatenation, the partial address 375 is derived by selecting the initial partial address 360 of the least significant (second) initial state c0. The selection of this initial partial address 360, follows from the fourth selection rule. In accordance with the fourth rule, the initial partial address 360 of the most significant state was not selected, because a "1" bit did not appear in the concatenation result. Further, according to the fifth address selection rule, a "1" bit is appended at the left of the initial partial address 360 of the state 365 c0, because c0 is the least significant state in the concatenation.

Similarly, the partial address 375 of the concatenation 366 [n11, c1] is determined according to Table IV, which indicates in parentheses that for this concatenation the partial address is derived by selecting the initial partial address of the least significant initial state 365 c1. Furthermore, in accordance with the fifth rule, a "1" bit is appended at the left of the initial partial address 360 of "1," because the selected initial partial address 360 is that of the least significant initial state. To complete the propagation of the initial states 365 and the initial partial addresses 360 from the first level 358 to the second level 367, the concatenation results 370 "c000" and "c001" are represented by states c0 and c1 373, as shown in FIG. 3.

Next, to propagate these states 373 from the second level 367 to a third level 375, the states c0 and c1 373 are concatenated 366 to produce a bit string "c11" 380. According to Table IV, c1 385 is the state representative of this concatenation result "c11" 380 with a partial address 390 derived from the most significant state (c0) in the concatenation of the second level 367. But the actual partial address 390 resulting from this concatenation is "011," since a "0" bit is appended to the left of the propagated partial address 375, in accordance with the fifth rule. As only one state is left in the third level 375, the state and address propagation is finished with the resulting state 385 representative of the fact that the bit pattern, i.e. the "1" bit, has been detected 110 in parallel with the operation 310, 115 in the result of the operation 310, 115. In addition, the location of the leading "1" bit in the result of the operation 310, 115 is given by the partial address "011," which is "3" in decimal notation. Consequently, the leading "1" bit has been detected in the third bit position (A3). To illustrate, actually adding 310 the entire first operand 315 and second operand 320 results in the sum string "00010001." This result confirms that the leading "1" bit is indeed in the third bit position (A3).

The process illustrated in FIG. 3 of propagating states and partial addresses can be implemented, as shown in FIG. 4. The bit strings 355 stored, for example, in a register are fed into the level one module 430 for determining the initial states 365 and the initial partial addresses 360. Level two module 440 processes these initial states 365 and initial partial addresses 360 to generate the states 373 and the partial addresses 375, as shown in the second level 367 of FIG. 3. Finally, level three module 450, for example, uses the states 373 and partial addresses 375 of the second level 367 to generate the final state 385 and the final address 390. Modules 430, 440 and 450 can be implemented as shown in the circuit of FIG. 5. Of course, more modules 430, 440, and 450 can be added for propagation through more than three levels.

Figure 5:
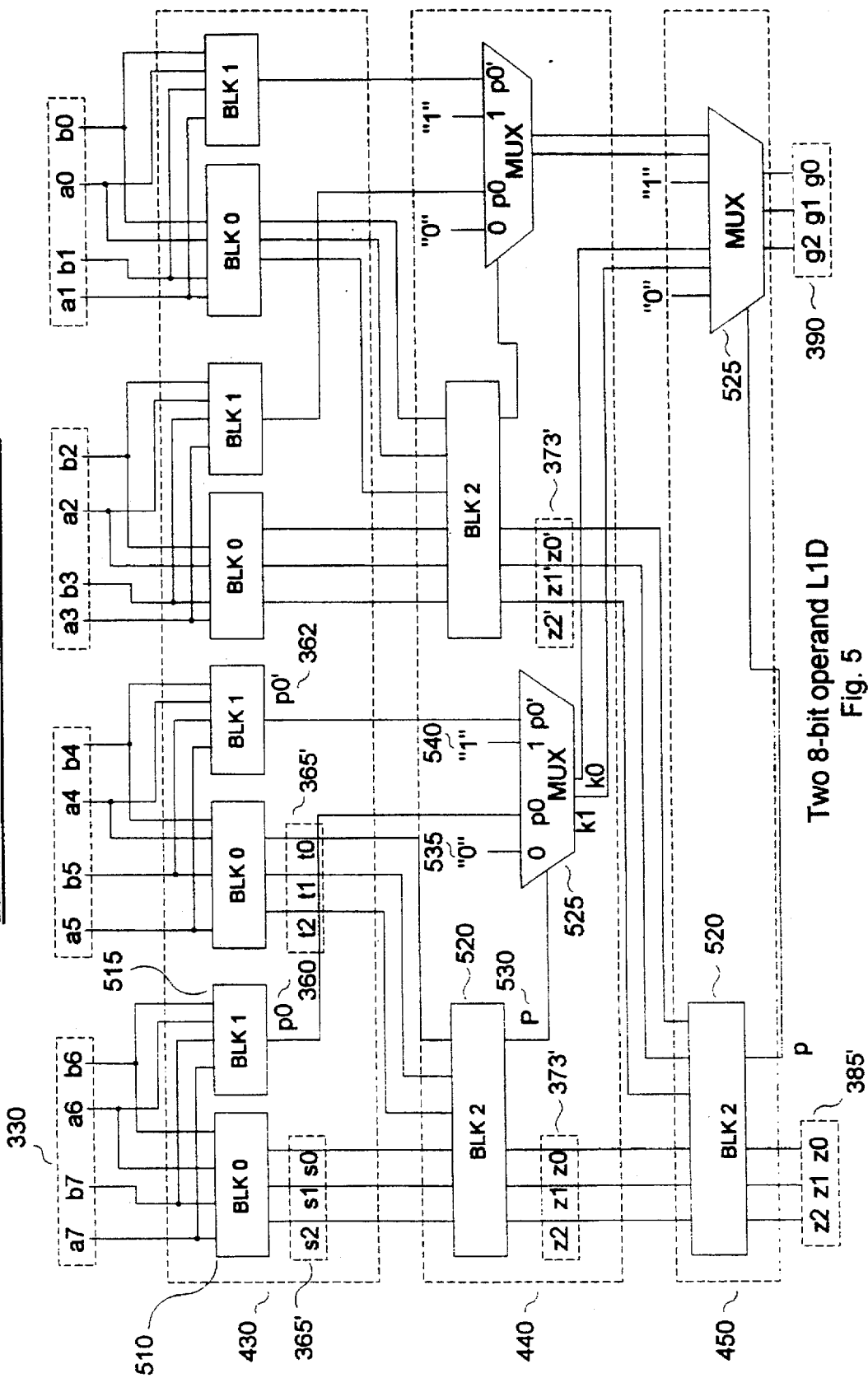
FIG. 5 is a more detailed diagram illustrating the circuit of the embodiment of FIG. 4.

FIGS. 5–8 illustrate circuits for implementing modules 430, 440 and 450. FIG. 5 is a circuit for operating 310 on bit groups 330 to produce a final state 385 and a final address 390. FIG. 5 is a lower level implementation of the circuit shown in FIG. 4. In FIG. 5, two 8-bit operands are being operated on 310. As shown in FIG. 5, the first operand 315 includes the following bit string from most significant bit to least significant bit: $a7,a6,a5,a4,a3,a2,a1,a0$. The second operand 320 includes the following bit string from most significant bit to least significant bit: $b7, b6, b5, b4, b3, b2, b1, b0$. As in FIG. 3, the operands 315, 320 are divided into four bit groups 330. Module 430 operates on the bit groups to generate encoded initial states $(s2,s1,s0, t2,t1,t0)$ 365' and initial partial addresses p0, p0', 360, 362. In the circuit of FIG. 5, module 430 comprises blocks 0 510 (see FIG. 6 for an example of a detailed circuit diagram) and blocks 1 515 (see also FIG. 6), as further described below. Second level module 440 includes blocks 2 520 (see also FIG. 7) and multiplexers 525. Blocks 2 accept as inputs the encoded initial states 365' from blocks 0 510 to propagate these initial states 365' to the second level for outputting partial states $(z2,z1,z0)$ 373. Adjacent pairs of blocks 1 515 couple initial addresses 360 as inputs into multiplexers 525. Each multiplexer 525 also takes a selector signal 530 generated by blocks 2 as an input to select the appropriate initial partial address 355' with a "0" 535 or a "1" bit 540 appended at the left of the selected initial partial address. The multiplexers 525 provide at their outputs k1,k0 the partial addresses 375. In module 450, block 2 520 is coupled to blocks 2 520 of module 440. Also, in module 450, multiplexer 525 is coupled to multiplexer 525 of module 440. Multiplexer 525 in module 450 also is coupled to a selector signal 530 from block 2 520 in module 450. Module 450 propagates the partial addresses 373, 375 to the third level at which a final encoded state 385 and a final address 390 are provided.

Table VI illustrates a preferred encoding of initial and partial states. For example, n00 is encoded as bit string "000."

TABLE VI

| L1D State Encoding | |
|---|---|
| state | encoded state |
| n00 | →000 |
| n01 | →100 |
| n11 | →101 |
| c0 | →110 |
| c1 | →111 |

Figure 6:
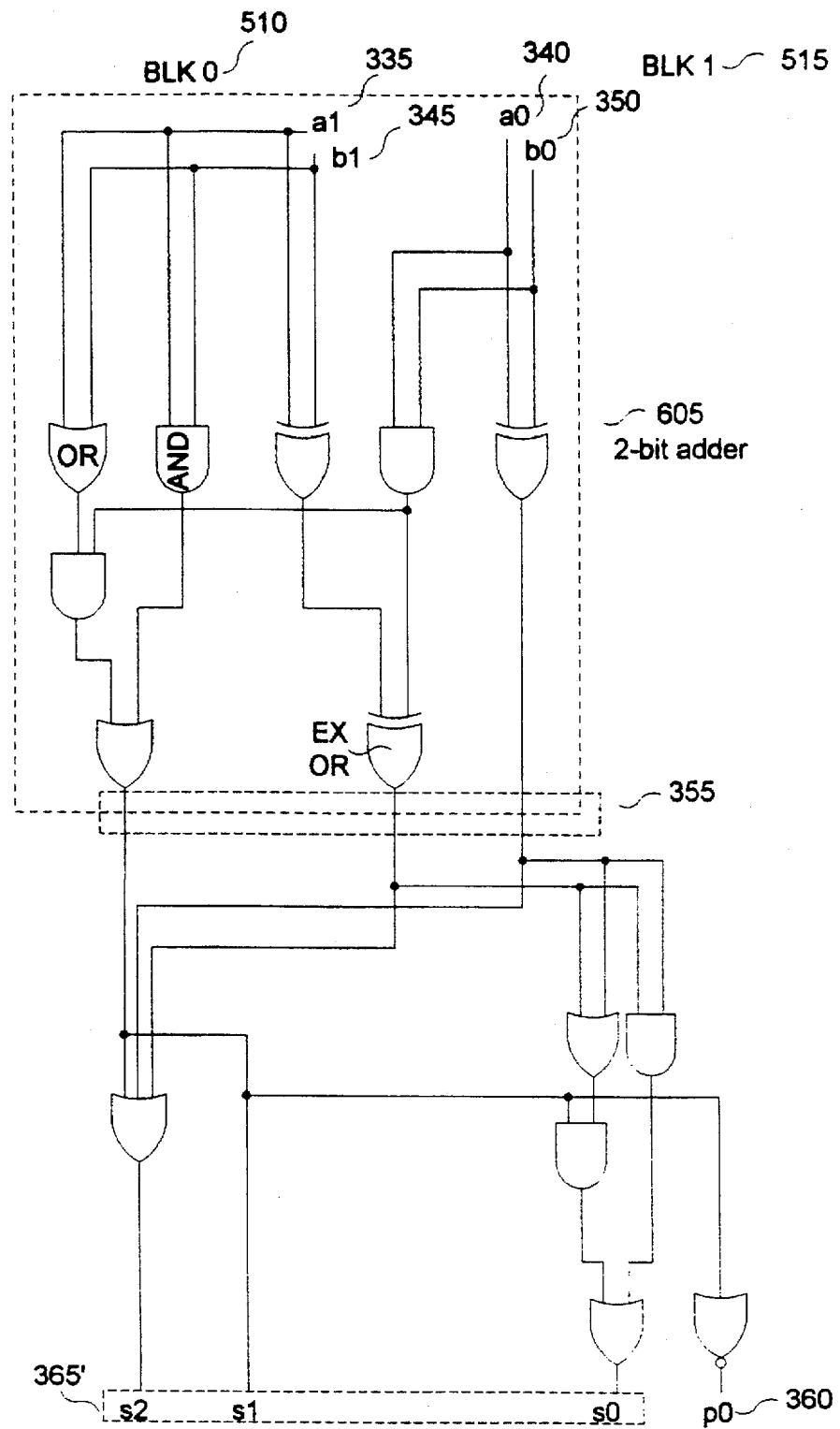
FIG. 6 is a diagram of a circuit for operating on bit groups to generate initial states and initial partial addresses, in accordance with the embodiment of FIG. 5.

FIG. 6 is a circuit for implementing blocks 0 510 and blocks 1 515 of FIG. 5. As can be seen from FIG. 6, this circuit implementation has block 0 510 and block 1 515 combined into a single circuit. Data bits 335 and 340 are added to data bits 345 and 350 by adder 605 to produce sum bit string 355. Encoder 610 converts sum bit string 355 into an encoded initial state (s2, s1, s0) 365' and an initial address p0 360.

Figure 7:
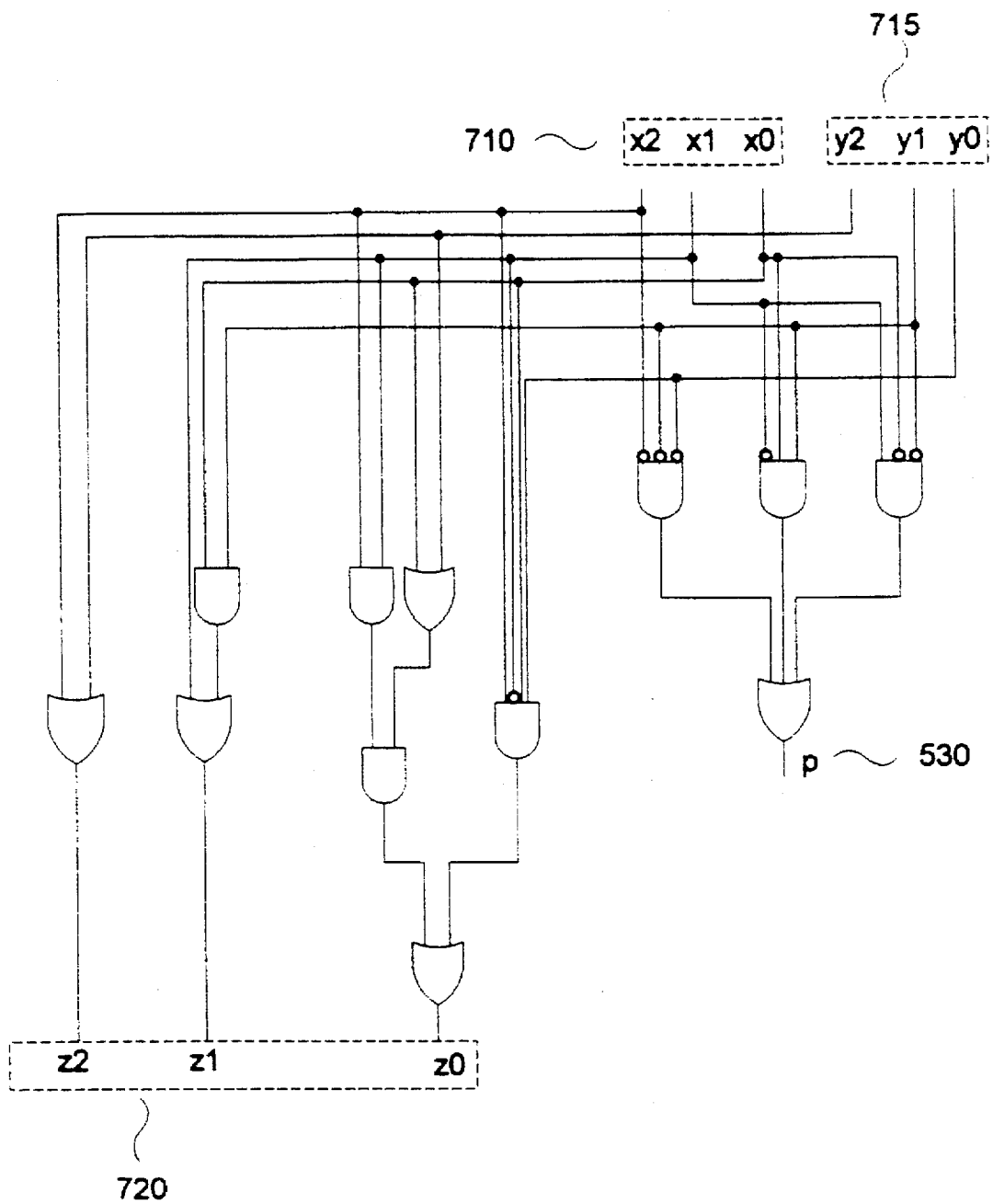
FIG. 7 is a diagram of a circuit for propagating partial states and partial addresses, in accordance with the embodiment of FIG. 5.

FIG. 7 is a circuit implementing any one of blocks 2 of FIG. 5. Block 2 has a first input 710 and a second input 715 comprising bits "x2,x1,x0" and "y2, y1, y0," respectively. With reference to FIG. 5, bits "x2,x1,x0" 710 correspond to, for example, bits "s2, s1, s0," 365, and bits "y2,y1,y0" correspond to, for example, bits "t2, t1, t0" 365. Block 2 has an output 720 comprising a data bit string "z2, z1, z0" and an address selector data bit 725. Of course, the actual first and second inputs 710, 715, are a function of the level in which a particular block 2 520 is located at. However, when block 2 520 is located within module 450, the first and second input 710, 715 are partial states 373. So, then the output 720 of block 2 520 becomes a final state 385.

Figure 8:
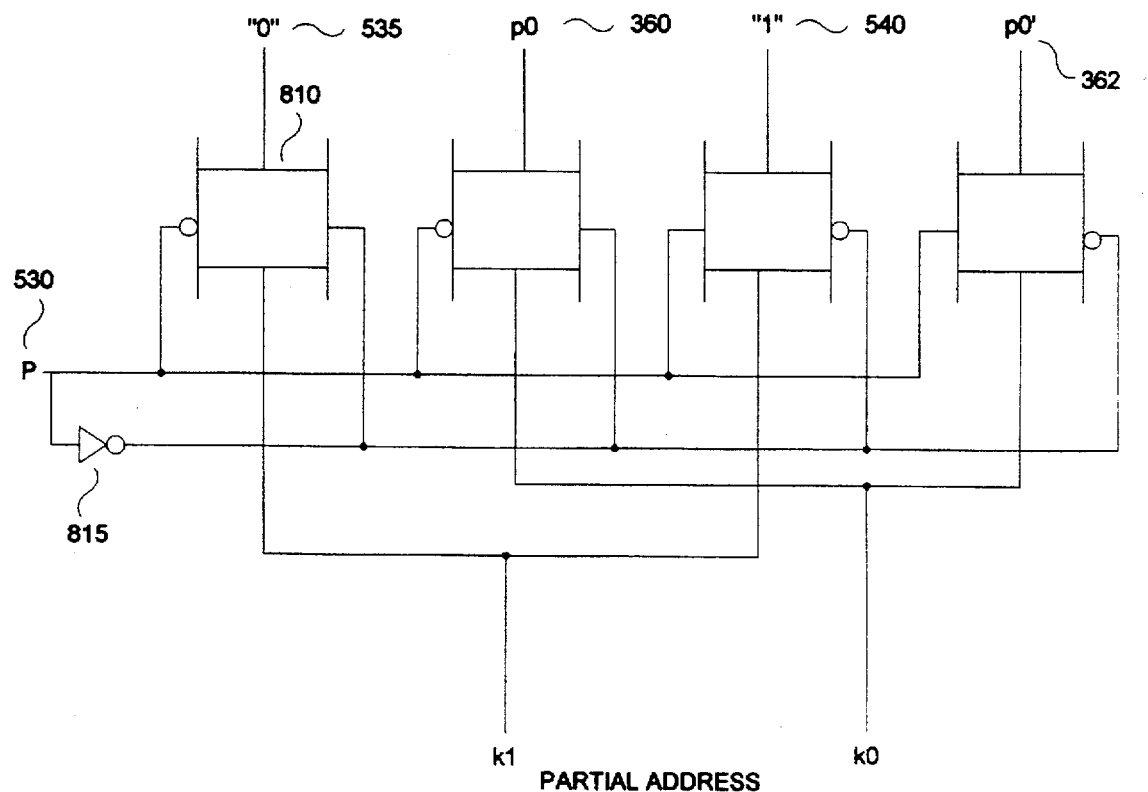
FIG. 8 is a circuit diagram of a multiplexer for propagating partial addresses, in accordance with the embodiment of FIG. 5.

FIG. 8 shows a multiplexer 525 in module 440 of FIG. 5. Multiplexer 525 is made with switches 810 that are implemented with full CMOS pass gate transistors. The inputs of the multiplexer 525 are those discussed in the context of FIG. 5. The output of the multiplexer 525 is coupled to the multiplexer 525 of module 450. It will be clear to one of skill in the art, based upon the present discussion, that the multiplexer 525 in module 450 is similar in structure to the multiplexer 525 in module 440. In the multiplexer 525 of FIG. 8, the transistors coupled to inputs 540 and 362 behave as closed switches when the selector signal 530 is high.

The preferred embodiment illustrated in FIG. 5 detects the most significant "1" bit with a plus or minus error of one bit position. So, a designer of the state propagation and partial address selection table can make the subtraction table different from the addition table. For example, the partial address of the result of a concatenation of the state n00 with the state n11 can have a partial address of "1" instead of "2".

Table VII below illustrates this embodiment as applied to two operands, the first operand (OP1) having an absolute value greater than that of the second one (OP2).

parallel with the addition of the first and second operands, without waiting for their sum to become available.

As in FIG. 3, the operands OP1 and OP2 in Table VII are divided into bit groups 330 made of bit pairs, the sums of which are represented by initial states (IST) 365 and initial partial addresses (IPA) 360. State propagation and partial address selection proceeds according to Table IV. In Table VII, states 373 and their partial addresses 375 are designated as ST and PA, respectively. In Table VII, for clarity of illustration, the five states n00, n01, n11, c0, and c1 are designated as n, N, t, c, and C, respectively. Also, for clarity, the addresses are designated by decimal numbers. In Table VII, there are six propagation levels (L1–L6) unlike in FIG. 3, where there are only three. As will be clear to one of skill in the art based upon the present disclosure, the number of levels is a function of the sizes of the operands OP1 and OP2, as well as the size of the bit groups 330. The sixth level shows the final result: state c1 (C) with a partial address of bit position "4," i.e., A4. So, final state 385 c1 (C) represents the fact that a "1" bit is detected, and final address 390 (4) represents the fact that a "1" bit first appears in the fourth bit position (A4). This result is confirmed, when examining the actual sum (SUM) of the first and second operands OP1 and OP2.

Table VIII shows another example (similar to the one shown in Table VII) of an addition of a first operand OP1 and a second operand OP2, which is in the two's complement form.

TABLE VII

Two Operand Leading One Detection for Subtraction

|    |     |      |      |      |      |      |      |      |      |      |      |      |      |      |      |      |      |
|----|-----|------|------|------|------|------|------|------|------|------|------|------|------|------|------|------|------|
|    | OP1 | 0001 | 0000 | 0000 | 0000 | 0000 | 0000 | 0000 | 0000 | 0000 | 0000 | 0000 | 0000 | 0000 | 0000 | 0001 | 0000 |
|    | OP2 | 1111 | 1110 | 1111 | 1111 | 1111 | 1111 | 1111 | 1111 | 1111 | 1111 | 1111 | 1111 | 1111 | 1111 | 1111 | 1111 |
|    | SUM | 0000 | 1111 | 0000 | 0000 | 0000 | 0000 | 0000 | 0000 | 0000 | 0000 | 0000 | 0000 | 0000 | 0000 | 0000 | 1111 |
| L1 | IST | t c  | t N  | t t  | t t  | t t  | t t  | t t  | t t  | t t  | t t  | t t  | t t  | t t  | t t  | t c  | t N  |
|    | IPA | 0 1  | 0 0  | 0 0  | 0 0  | 0 0  | 0 0  | 0 0  | 0 0  | 0 0  | 0 0  | 0 0  | 0 0  | 0 0  | 0 0  | 0 1  | 0 0  |
| L2 | ST  | c    | N    | t    | t    | t    | t    | t    | t    | t    | t    | t    | t    | t    | t    | c    | N    |
|    | PA  | 3    | 0    | 0    | 0    | 0    | 0    | 0    | 0    | 0    | 0    | 0    | 0    | 0    | 0    | 3    | 0    |
| L3 | ST  |      | C    |      | t    |      | t    |      | t    |      | t    |      | t    |      | t    |      | C    |
|    | PA  |      | 4    |      | 0    |      | 0    |      | 0    |      | 0    |      | 0    |      | 0    |      | 4    |
| L4 | ST  |      |      | C    |      |      |      | t    |      |      |      | t    |      |      |      |      | C    |
|    | PA  |      |      | 4    |      |      |      | 0    |      |      |      | 0    |      |      |      |      | 12   |
| L5 | ST  |      |      |      |      | C    |      |      |      |      |      |      |      |      |      |      | C    |
|    | PA  |      |      |      |      | 4    |      |      |      |      |      |      |      |      |      |      | 28   |
| L6 | ST  |      |      |      |      |      |      |      |      |      |      |      |      |      |      |      | C    |
|    | PA  |      |      |      |      |      |      |      |      |      |      |      |      |      |      |      | 4    |

The second operand is a negative number in the two's complement form. The sign bits are not shown. Although this operation is a subtraction, as already explained, due to the use of the two's complement it proceeds as an addition. For illustrative purposes, only, the sum (SUM) of the first (OP1) and second (OP2) operands is shown immediately below the second operand, although, as explained in the context of FIG. 1, this embodiment preferably proceeds in

TABLE VIII

Two Operand Leading One Detection for Subtraction

|    |      |      |      |      |      |      |      |      |      |      |      |      |      |      |      |      |      |      |
|----|------|------|------|------|------|------|------|------|------|------|------|------|------|------|------|------|------|------|
|    | OP1  | 0001 | 0000 | 0000 | 0000 | 0000 | 0000 | 0000 | 0000 | 0000 | 0000 | 0000 | 0000 | 0000 | 0000 | 0001 | 0001 |
|    | OP2  | 1111 | 0111 | 1111 | 1111 | 1111 | 1111 | 1111 | 1111 | 1111 | 1111 | 1111 | 1111 | 1111 | 1111 | 1111 | 0111 |
|    | SUM  | 0000 | 1000 | 0000 | 0000 | 0000 | 0000 | 0000 | 0000 | 0000 | 0000 | 0000 | 0000 | 0000 | 0000 | 0000 | 1000 |
| L1 | IST  | t c  | N t  | t t  | t t  | t t  | t t  | t t  | t t  | t t  | t t  | t t  | t t  | t t  | t t  | t t  | t c N t |
|    | IPA  | 0 1  | 1 0  | 0 0  | 0 0  | 0 0  | 0 0  | 0 0  | 0 0  | 0 0  | 0 0  | 0 0  | 0 0  | 0 0  | 0 0  | 0 0  | 0 1 1 0 |
| L2 | ST   | c    | N    | t    | t    | t    | t    | t    | t    | t    | t    | t    | t    | t    | t    | c    | N    |
|    | PA   | 3    | 1    | 0    | 0    | 0    | 0    | 0    | 0    | 0    | 0    | 0    | 0    | 0    | 0    | 3    | 1    |
| L3 | ST   |      | C    |      | t    |      | t    |      | t    |      | t    |      | t    |      | t    |      | C    |
|    | PA   |      | 5    |      | 0    |      | 0    |      | 0    |      | 0    |      | 0    |      | 0    |      | 5    |
| L4 | ST   |      |      | C    |      |      |      | t    |      |      |      |      |      | t    |      |      | C    |
|    | PA   |      |      | 5    |      |      |      | 0    |      |      |      |      |      | 0    |      |      | 13   |
| L5 | ST   |      |      |      |      |      |      | C    |      |      |      |      |      |      |      |      | C    |
|    | PA   |      |      |      |      |      |      | 5    |      |      |      |      |      |      |      |      | 29   |
| L6 | ST   |      |      |      |      |      |      |      |      |      |      |      |      |      |      |      | C    |
|    | PA   |      |      |      |      |      |      |      |      |      |      |      |      |      |      |      | 5    |

In Table VIII in the sixth level (L6), the final state 385, c1 (C), indicates that a "1" bit was detected in the sum of the two operands 315, 320 (OP1 and OP2). Of course, preferably, here, too, the leading one detection proceeds in parallel with the generation of the sum (SUM). The final state's 385 final address (5) 395 indicates that once the sum is actually computed, the "1" bit will appear in the fifth bit position (A5). However, examining the actual sum (SUM) in Table VIII, the leading "1" bit appears in the fourth bit position. So, this is an example of an error of one bit position that can occur in this embodiment. But it will be clear to one of ordinary skill in the art, based upon the present disclosure, that at the cost of having additional states this error can be avoided. These additional states are used to represent the occurrences when a carry is generated as a result of a concatenation.

Leading Transition Detection

Another presently preferred embodiment includes a method and associated circuitry for a leading transition detection for two operands, such as floating point numbers. Detection of the leading transition allows for quick normalization of floating point numbers without a determination of, for example, which of the two operands has a larger absolute value. The leading transition indicates the bit position of the leading one bit. As will be clear to a person of ordinary skill in the art, the following discussion can be extended to more than two operands 315, 320.

A transition in a bit string is a change from a "0" bit to a "1" bit, or vice versa, as occurs, for example, in the bit string "001110" between bit positions A1 and A2 and bit positions A4 and A5. In this bit string, the leading transition is between bit positions A1 and A2. Preferably, this leading transition detection embodiment operates on operands 315, 320 including their sign bits. In order to speed up floating point addition (or subtraction), the leading transition detection should be performed as early as possible for normalization, even before the sum bits are generated. Consequently, this preferred embodiment proceeds in parallel with an operation 115, as does the leading one detection 110 in FIG. 1.

Transitions can occur when two binary numbers are added together, as illustrated below with additions of 5-bit two's complement numbers. (Of course, this embodiment is not limited to numbers in two's complement form. Other representations of numbers can be used, such as the one's complement form. In fact, neither number needs to be in the two's complement form, as in the simple case of an addition of two numbers.) For example, subtracting a floating point number "14" from a floating point number "1" by adding "1" (0_0001) to the two's complement of "14" (1_0010) results in the negative sum "−13" (1_0011). As is standard in the two's complement format, the most significant bit is the sign bit. (For simplicity, the exponents of these floating point numbers are not shown). So in the sum "−13," a leading transition "10" occurs between the sign bit and bit position A0. Were the sign bit not included, the leading transition position would be mistaken as "01," i.e., the transition between bit positions A1 and A2.

In this example, where the negative sum equals "−13" (1_0011), the most significant bit in the positive sum is in bit position A0, as can be seen by taking the two's complement of the negative sum. The two's complement of "−13" equals "0_1101," which confirms that the leading transition "10" in the negative sum occurred at the bit position of the leading "1" bit. As discussed above, knowing the location of the leading "1" bit in the positive sum permits floating point normalization. Preferably, however, the negative sum ("−13") is normalized directly by using the location of the leading "0" bit, without computing the two's complement of the negative sum to convert it into a positive sum.

In this presently preferred embodiment of a leading transition detection, more than five states are used. For instance, the state n01, discussed above, is divided into more states. The following first and second concatenations of bit strings illustrate the reason.

| First:  | [1111, n000111] = n1111000111 |
|---------|-------------------------------|
| Second: | [1111, n111000] = n1111111000 |

Although the resulting bit strings of the first and second concatenations are within the scope of bit strings represented by a single state n01, in this embodiment, they are not. Here they are represented by different states, because for the first concatenation result the partial address of the most significant bit string is selected. This is done because the leading transition "10" occurs in the most significant half of the first concatenation result. But for the second concatenation result, the partial address of the second bit string is selected, because the leading transition occurs in the least significant half of the second concatenation result.

This type of analysis leads to the creation of the following states without carries representative of bit strings shown in brackets:

n000={n00, n000, n0000, n00000, ........}, where all bits equal zero;

n001={n001, n001, n0010, n0011,...}, where the first two leading bits equal zero;

n011={n01, n011, n0111, n01111...}, where the leading bit equals zero;
n100={n10, n100, n101.........}, where the leading bit equals one;
n110={n110, n1110, n11110,.....}, where only the least significant bit equals zero;
n111={n11, n111, n111,......}, where all bits equal one.

The following examples illustrate a third and a fourth concatenation of two bit strings, one of which has a carry.

| | | |
|---|---|---|
| Third: | [1111, c000111] | = c0000000111 |
| Fourth: | [1111, c111000] | = c0000111000 |

Following the reasoning applied above to the first and second concatenation results, the partial address for the third concatenation result is selected from the least significant bit string in the third concatenation. The partial address for the fourth concatenation result is selected from the most significant bit string of the fourth concatenation.

in accordance with FIG. 2. Also, similarly to FIG. 3, Table VII, and Table VIII, the operands 315, 320 are divided into bit groups 330. An operation 115 is performed on each bit group 330. This operation 115 can be performed, as illustrated in FIG. 4. Initial partial states and addresses are assigned to the results of the operation 115 on the bit groups 330. Then these initial partial states and addresses are propagated through several levels of modules. In this embodiment, the initial partial address is the position of the second bit that comprises the bit transition. For example, the initial partial address of a bit string including a sign bit "00010" is A2, because the "1" bit, which is the second bit from the left of the bit pattern "01," occurs at bit position A2.

Table IX shows partial addresses of bit strings of four bits. The first bit of these bit strings is a sign bit, when the bit string includes the sign bit of the operand 315, 320 from which the bit string is taken. The sign bit of an operand 315, 320 is treated as an ordinary bit, i.e., a bit in bit position A0. In Table IX, "IPA" stands for initial partial address of the bit string shown immediately above.

TABLE IX

Initial Partial Addresses of Four Bit Strings

| bit string | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| IPA | 3 | 3 | 2 | 2 | 1 | 1 | 1 | 1 | 1 | 1 | 1 | 1 | 2 | 2 | 3 | 3 |

Because these two partial addresses are selected from different bit strings, the third and fourth concatenation results are represented by more than the single state c1. Indeed, similar reasoning leads to the observation that the following states with a carry can be used for this leading transaction detection in addition to the six states described above: n000, n001, n011, n100, n110 and n111. The following additional five states with carries represent bit strings identical to those represented by the corresponding states without carries, respectively: c000, c001, c011, c100 and c110.

This presently preferred embodiment of a leading transition detection is executed on at least two operands 315, 320

Table X below is similar to Table IV. Table X is the state and partial address propagation table for this leading transition detection. Table X generally incorporates the five propagation rules discussed above in the context of Table IV. Table X is in the same format as the propagation table for a leading one detection, Table IV, except that for economy of space, commas instead of parentheses separate the states (resulting from the concatenation of a first and a second states) from their partial addresses.

TABLE X

State and Partial Address Propagation for Leading Transition

| 1st/2nd | n000 | n001 | n011 | n100 | n110 | n111 | c000 | c001 | c011 | c100 | c110 |
|---|---|---|---|---|---|---|---|---|---|---|---|
| n000 | n000,2 | n001,2 | n001,2 | n001,1 | n001,1 | n001,1 | n001,1 | n001,1 | n001,1 | n001,1 | n001,1 |
| n001 | n001,1 | n001,1 | n001,1 | n001,1 | n001,1 | n001,1 | n001,1 | n001,1 | n001,1 | n001,1 | n001,1 |
| n011 | n001,1 | n001,1 | n001,1 | n001,1 | n001,1 | n011,1 | n100,1 | n100,1 | n100,1 | n100,1 | n100,1 |
| n100 | n100,1 | n100,1 | n100,1 | n100,1 | n100,1 | n100,1 | n100,1 | n100,1 | n100,1 | n100,1 | n110,1 |
| n110 | n100,1 | n100,1 | n100,1 | n100,1 | n100,1 | n100,1 | n100,1 | n100,1 | n100,1 | n100,2 | n110,2 |
| n111 | n100,1 | n100,1 | n100,1 | n100,2 | n110,2 | n111,2 | c000,2 | c001,2 | c001,2 | c001,1 | c001,1 |
| c000 | c000,2 | c001,2 | c001,2 | c001,1 | c001,1 | c001,1 | c001,1 | c001,1 | c001,1 | c001,1 | c001,1 |
| c001 | c001,1 | c001,1 | c001,1 | c001,1 | c001,1 | c001,1 | c001,1 | c001,1 | c001,1 | c001,1 | c001,1 |
| c011 | c001,1 | c001,1 | c001,1 | c001,1 | c001,1 | c011,1 | c100,1 | c100,1 | c100,1 | c100,1 | c100,1 |
| c100 | c100,1 | c100,1 | c100,1 | c100,1 | c100,1 | c100,1 | c100,1 | c100,1 | c100,1 | c100,1 | c100,1 |
| c110 | c100,1 | c100,1 | c100,1 | c100,1 | c100,1 | c100,1 | c100,1 | c100,1 | c100,1 | c100,2 | c110,2 |

By applying Table X to an addition of operands, the position of the leading bit transition can be detected within a plus or minus one bit position accuracy. The following illustrates how this possible error is introduced. A concatenation [0001, c111] results in bit string "0010111," in which the leading transition occurs at bit position A2. This represents a shift to the left by one bit position from bit position A3, where the leading transition occurred originally in the most significant bit string "0001." Similarly, a concatenation [11110, c000] results in a bit string "11111000," where the leading transition is shifted to the right from its location in bit string "11110."

Figure 9:
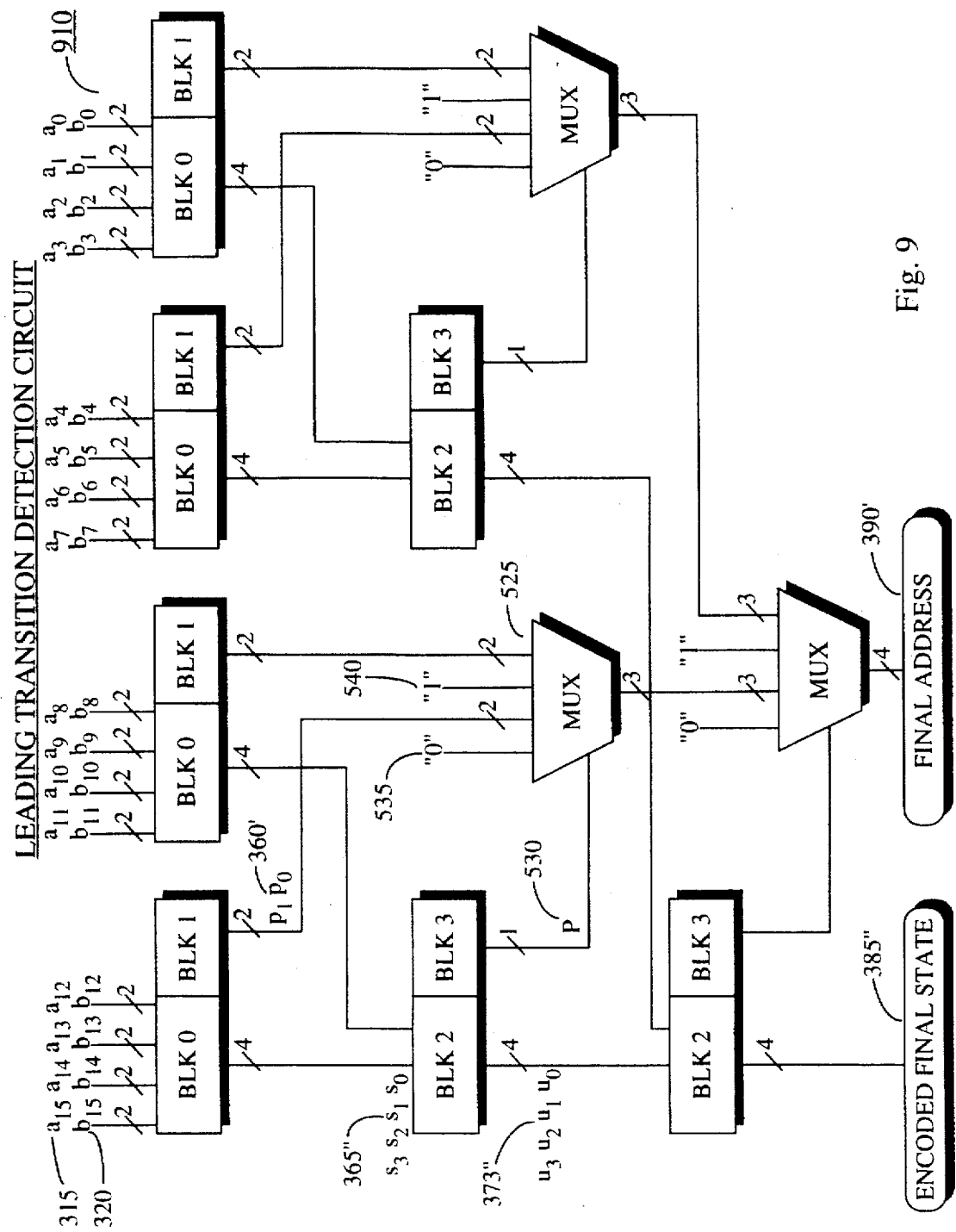
FIG. 9 is a diagram of a circuit for leading transition detection for a subtraction of two numbers, in accordance with a presently preferred embodiment of the invention.

FIGS. 9 through 12 illustrate circuits for implementing this embodiment of leading transition detection. FIG. 9 shows a circuit for detecting a leading transition for a subtraction of a sixteen bit operand from another 16 bit operand. The leading transition detection circuit of FIG. 9 is 910 divides the first and second operands 315, 320 into bit groups 330 (not shown in FIG. 9) having bit strings of four bits each. This leading transition detection circuit 910 generates from the bit groups 330 encoded initial partial states 365" and initial partial addresses 360'. The initial partial states 365" and initial partial addresses 360' are propagated through the leading transition detection circuit 910 resulting in an encoded final state 385" and an encoded final address 390', similar to the circuit of the leading one detection shown in FIG. 5.

Table V illustrates a preferred encoding of initial and partial states for the leading transition detection circuit of FIG. 9. For example, n000 is encoded as bit string "0000." Table V also shows alternative encoding for some states.

TABLE V

LTD State Encoding

| state | encoded state |
| --- | --- |
| n000 → | 0000 |
| n001 → | 0001 (or 0010) |
| n011 → | 0011 |
| n100 → | 0100 (or 0101) |
| n110 → | 0110 |
| n111 → | 0111 |
| c0 → | 1000 |
| c001 → | 1001 (or 1010) |
| c011 → | 1011 |
| c100 → | 1100 (or 1101) |
| c110 → | 1110 (or 1111) |

Figure 10:
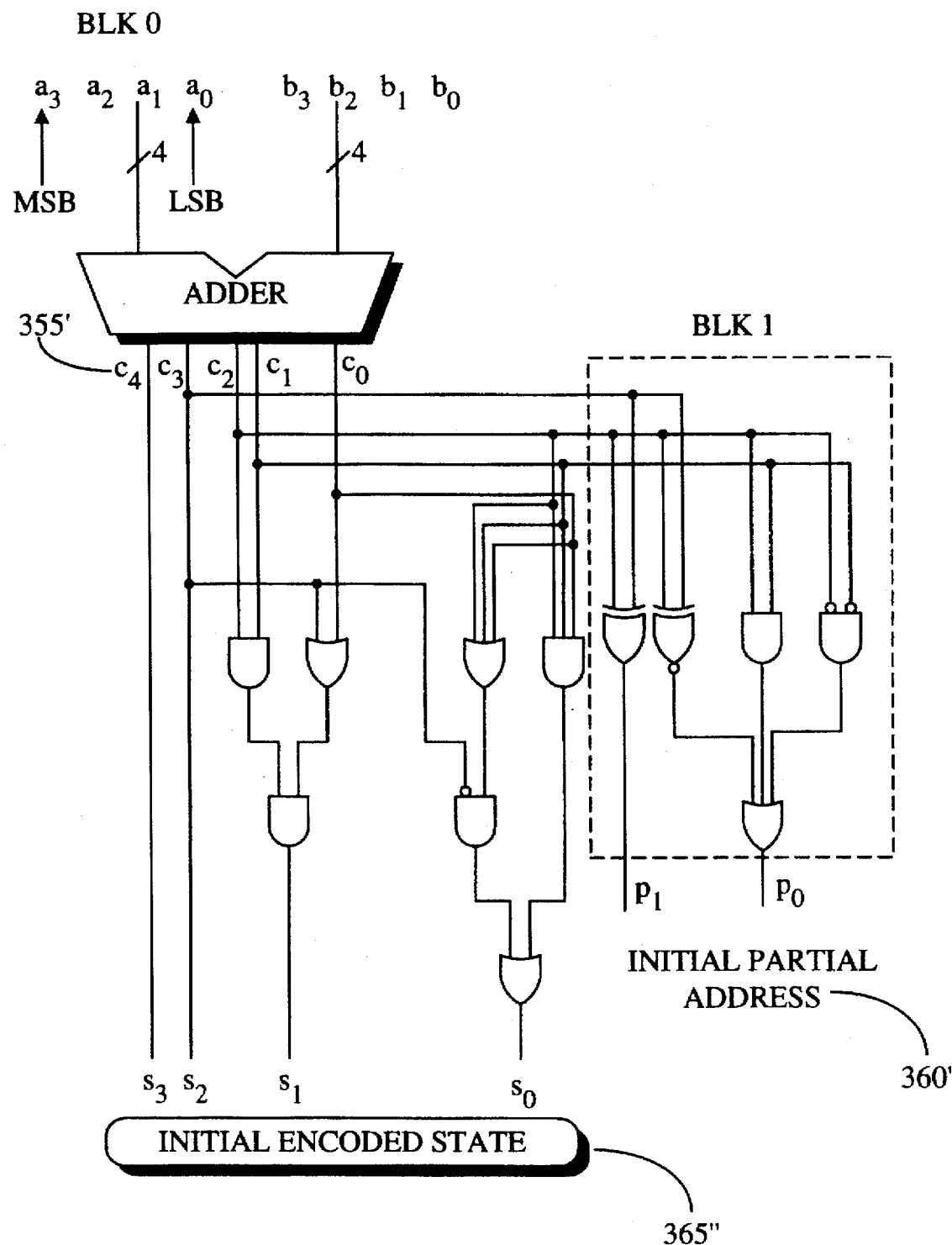
FIG. 10 is a diagram of a circuit for operating on bit groups to generate initial states and initial partial addresses, in accordance with the embodiment of FIG. 9.
Figure 11:
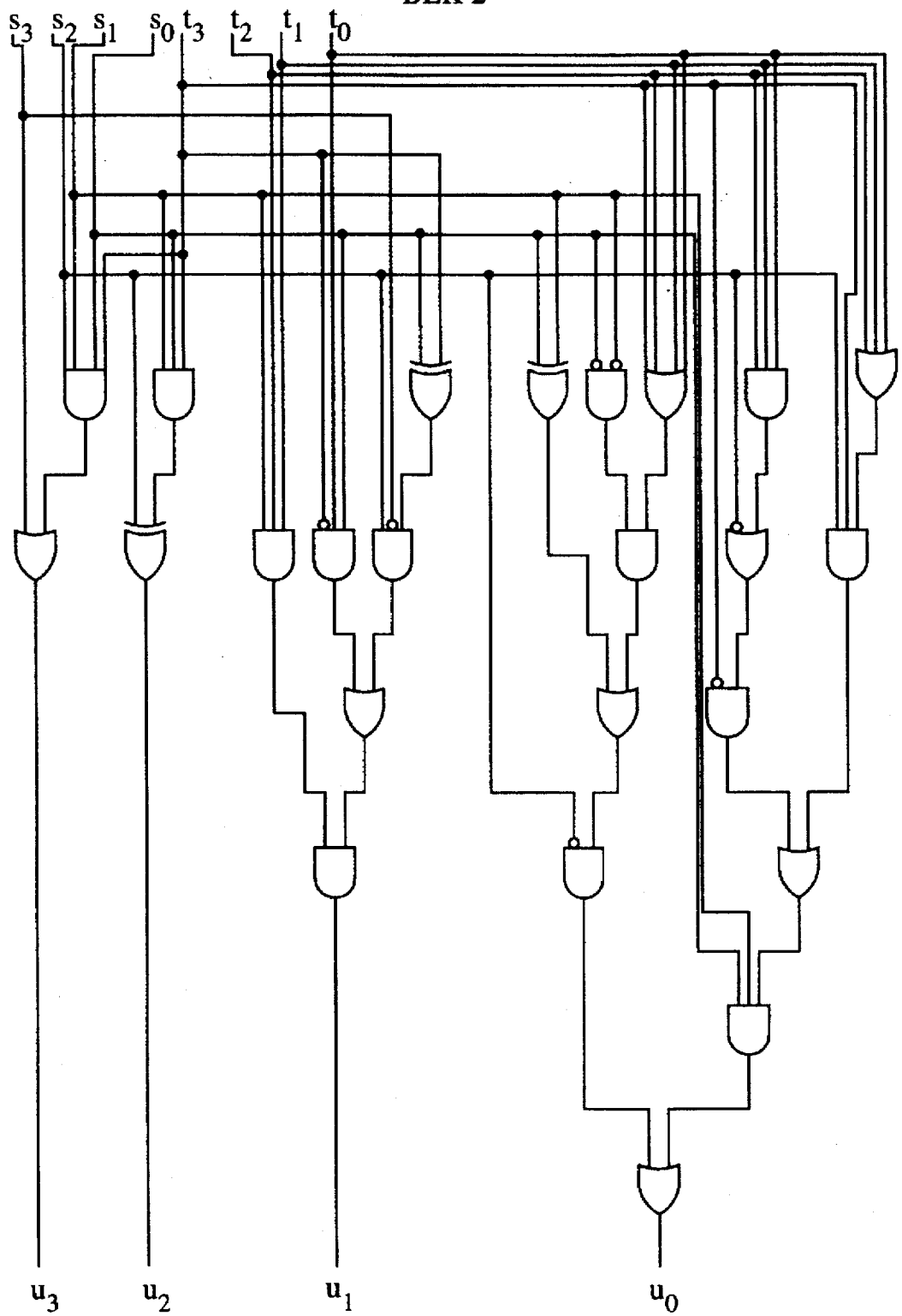
FIG. 11 is a diagram of a circuit for generating a partial state, in accordance with the embodiment of FIG. 9.
Figure 12:
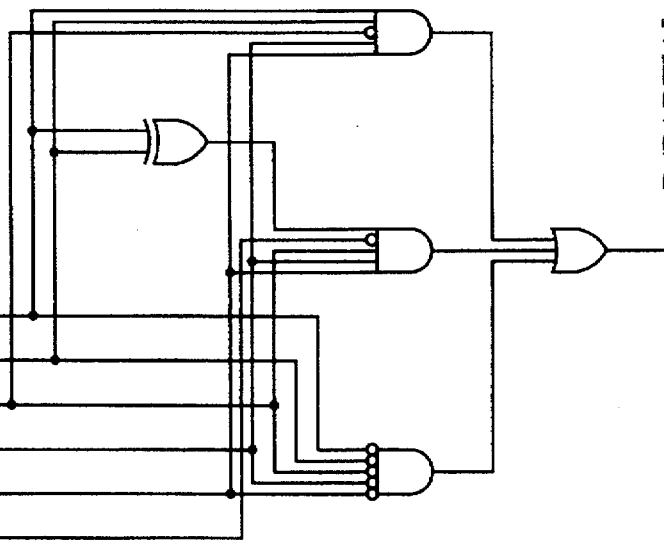
FIG. 12 is a diagram of a circuit for generating a partial address selector signal, in accordance with the embodiment of FIG. 9.

FIG. 10 is a detailed circuit of individual block 0 and block 1 shown in the leading transition detection circuit 910 of FIG. 9. The circuit of FIG. 10 adds the sum bit strings 355' of a bit group 330 and encodes the sum bit strings 355' to generate an initial encoded state 365" and an initial partial address 360'. FIG. 11 shows a detailed circuit for block 2 of FIG. 9. FIG. 12 is a detailed circuit of block 3 of FIG. 9. Block 3 concatenates a first encoded state with a second encoded state to produce a partial address selector signal P 530.

Several preferred embodiments of the present invention have been described. Nevertheless, it will be understood that various modifications may be made without departing from the spirit and scope of the invention. For example, the discussion above has been in terms of a process for operating on bit groups 330 by use of modules 430, 440, and 450. However it will be clear to one of ordinary skill in the art that the above described embodiments can be implemented entirely by a processor with appropriate software incorporating the above described embodiments. One of skill in the art also will realize that there are many other ways of encoding states other than those shown in Tables VI and V. Thus, the present invention is not limited to the preferred embodiments described herein, but may be altered in a variety of ways, which will be apparent to persons skilled in the art.

I claim:

1. A process for detecting a bit pattern in the result of an operation on at least a first operand and a second operand, each operand having a plurality of data bits in bit positions, the process comprising the steps of:

receiving with a circuit a plurality of bit groups from the operands, the bit groups comprising data bits from identical bit positions from each operand;

executing with the circuit the operation on each bit group for generating bit strings, each bit string corresponding to one bit group;

assigning with the circuit a predetermined corresponding initial state and a predetermined corresponding initial partial address for each bit string; and propagating with the circuit the initial states and initial partial addresses for generating a final state and a final address representative of the bit pattern by concatenation of the initial states and selection of the initial partial addresses.

2. The process of claim 1, wherein all bit groups comprise an equal number of data bits.

3. The process as recited in claim 1, further comprising the step of encoding the initial states.

4. The process as recited in claim 1, wherein the data bits include a sign bit.

5. The process as recited in claim 1, wherein the step of receiving a plurality of bit groups occurs substantially in parallel with the operation on at least the first operand and the second operand.

6. The process as recited in claim 1, wherein, when the operation is a subtraction, the step of executing the operation on each bit group comprises the steps of subtracting data bits of at least the first operand from data bits of the second operand; and subtracting data bits of at least the second operand from data bits of the first operand.

7. The process as recited in claim 1, wherein the step of propagating comprises the steps of:

concatenating each pair of adjacent initial states to generate a corresponding state; and generating a partial address for each corresponding state by selecting, based on the pair of adjacent initial states for the corresponding state, one initial partial address of the pair of adjacent initial states.

8. The process as recited in claim 7, wherein pairs of adjacent initial states comprise a least significant initial state, wherein the step of generating a partial address comprises selecting an initial partial address of the least significant initial state, and appending a one data bit to the least significant initial partial address of the least significant initial state.

9. The process as recited in claim 7, wherein the step of generating a partial address for each corresponding state by selecting one initial partial address comprises selecting one initial partial address based on a state and partial address propagation table.

10. The process as recited in claim 7, wherein pairs of adjacent initial states comprise a most significant initial state, wherein the step of generating a partial address comprises selecting an initial partial address of the most significant initial state, and appending a zero data bit to an initial partial address of the most significant initial state.

11. An apparatus for detecting a bit pattern in the result of an operation on at least a first operand and a second operand, each operand having a plurality of data bits in bit positions, the apparatus comprising:

a circuit configured to receive a plurality of bit groups from the operands, the bit groups comprising data bits from identical bit positions from each operand;

execute the operation on each bit group and thereby generate bit strings, each bit string corresponding to one bit group;

assign a predetermined corresponding initial state and a predetermined corresponding initial partial address for each bit string; and propagate the initial states and initial partial addresses and thereby generate a final state and a final address representative of the bit pattern by concatenation of the initial states and selection of the initial partial addresses.

12. The apparatus of claim 11, wherein all bit groups comprise an equal number of data bits.

13. The apparatus as recited in claim 11, further configured to encode the initial states.

14. The apparatus as recited in claim 11, wherein the data bits include a sign bit.

15. The apparatus as recited in claim 11, wherein the circuit is configured to receive a plurality of bit groups substantially in parallel with the operation on at least the first operand and the second operand.

16. The apparatus as recited in claim 11, wherein the circuit is configured to propagate by concatenating each pair of adjacent initial states to generate a corresponding state, and by generating a partial address for each corresponding state by selecting, based on the pair of adjacent initial states for the corresponding state, one initial partial address of the pair of adjacent initial states.

17. The apparatus as recited in claim 16, wherein pairs of adjacent initial states comprise a most significant initial state, wherein the circuit is configured to generate a partial address by selecting an initial partial address of the most significant initial state, and by appending a zero data bit to an initial partial address of the most significant initial state.

18. The apparatus as recited in claim 16, wherein pairs of adjacent initial states comprise a least significant initial state, wherein the circuit is configured to generate a partial address by selecting an initial partial address of the least significant initial state, and by appending a one data bit to the least significant initial partial address of the least significant initial state.

19. The apparatus as recited in claim 16, wherein the circuit is configured to generate a partial address for each corresponding state by selecting one initial partial address based on a state and partial address propagation table.

20. An apparatus for detecting a bit pattern in the result of an operation on at least a first operand and a second operand, each operand having a plurality of data bits in bit positions, the apparatus comprising:

means for receiving a plurality of bit groups from the operands, the bit groups comprising data bits from identical bit positions from each operand;

means for executing the operation on each bit group for generating bit strings, each bit string corresponding to one bit group;

means for assigning a predetermined corresponding initial state and a predetermined corresponding initial partial address for each bit string; and means for propagating the initial states and initial partial addresses for generating a final state and a final address representative of the bit pattern by concatenation of the initial states and selection of the initial partial addresses.

* * * * *